Patented July 13, 1937

2,086,691

UNITED STATES PATENT OFFICE 2,086,691

PROCESS FOR PRODUCING AMINO COMPOUNDS OF THE QUINOLINE SERIES

Werner Zerweck and Wilhelm Kunze, Frankfort-on-the-Main-Fechenheim, Germany, assignors to General Aniline Works, Inc., New York, N. Y., a corporation of Delaware No Drawing. Application April 15, 1935, Serial No. 16,507. In Germany April 24, 1934

2 Claims. (Cl. 260—38)

Our invention relates to a process for producing amino compounds of the quinoline series which consists in reacting with compounds of the general formula:

wherein $R_1$ is hydrogen, $R_2$ hydrogen or an aliphatic radicle and $R_3$ is hydrogen or an aliphatic, cycloaliphatic or aromatic hydrocarbon radicle of the benzene or naphthalene series, i. e. with ammonia or amines of the aliphatic, cycloaliphatic or aromatic series containing at least one hydrogen atom attached to the nitrogen atom, on quinoline sulfonic acids containing the sulfonic acid groups in the pyridine nucleus. The reaction is advantageously carried out by heating the components with the addition of a condensing agent of the type of zinc chloride or copper. In this manner the aminoquinolines and their N-substitution products which are partly new compounds are obtained with an excellent yield.

Compared with the hitherto known methods of preparing the said compounds by starting from the corresponding halogen-compounds the present process is superior owing to the fact that in all cases, even when using amines as components, the reaction can be carried out in an aqueous medium and at lower temperatures so that the formation of undesired by-products particularly of the corresponding hydroxy-quinolines can be avoided.

In order to further illustrate our invention, the following examples are given, the parts being by weight and all temperatures in centigrade degrees. We wish it however to be understood that our invention is not limited to the particular products nor reaction conditions mentioned therein.

Example 1

6 parts of quinoline-2-sulfonic acid (obtainable by boiling 2-chloroquinoline with an aqueous sodium sulfite solution) are mixed with 25 parts of an ammonia solution of 25% strength and about 1 part of zinc chloride and the mixture is heated for some hours in a closed vessel at about 135° C. When cool the separating 2-amino-quinoline is isolated. It corresponds to the formula:

In a pure state, when recrystallized from water, it melts at 127° C.

Example 2

5 parts of 4-methylquinoline-2-sulfonic acid are mixed with 25 parts of an ammonia solution of 25% strength and 1 part of zinc chloride and the mixture is heated for some hours at 130 to 135° C. The reaction product is filtered off when cool. When recrystallized from water the lepidine of the formula:

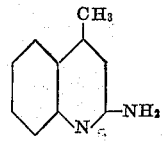

is obtained in a pure state, melting at 130 to 131° C.

Example 3

5 parts of the disodium salt of quinoline-2.4-disulfonic acid are mixed with 30 parts of an ammonia solution of 40% strength and 1 part of zinc chloride and the mixture is heated for some time at 110 to 120° C. When cool the reaction product separates. It may be recrystallized from water and then from ortho-dichlorobenzene. It forms colorless needles of 188 to 190° C. melting point and a nitrogen content of 25.2%. The product therefore substantially consists of the hitherto unknown 2.4-diamino-quinoline of the formula:

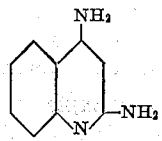

for which the theoretical nitrogen-content is 26.4%.

The quinoline 2.4-disulfonic acid used as starting material may be obtained by heating 2.4-dichloro-quinoline with an aqueous sodium sulfite solution. In contradistinction to the monosulfonic acids the quinoline-2.4-disulfonic acid is easily soluble in water.

Example 4

A mixture of 12 parts of quinoline-4-sulfonic acid and 60 parts of an ammonia solution of 25% strength is heated at about 130° C. for 15 hours. The reaction product which primarily separates as an oil solidifies after some time. Recrystallized from water the 4-amino-quinoline thus formed of the formula:

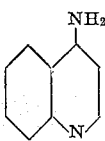

melts at 70° C., it contains in the crystallized form one mole of crystal water.

Example 5

A mixture of 12 parts of quinoline-2-sulfonic acid, 30 parts of an aqueous dimethylamine solution of 25% strength and 0.3 part of copper bronze is heated for 12 hours at 140° C. When cool the reaction product is isolated by extracting the reaction mass with ether. After having removed the ether the formed 2-dimethyl-amino-quinoline of the formula:

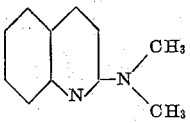

which was hitherto unknown, solidifies. It crystallizes from dilute methylalcohol in the form of colorless prisms of 70 to 71° C. melting point.

Example 6

6 parts of quinoline-2-sulfonic acid are mixed with 9 parts of 1-diethylamino-4-amino-n-pentane of the formula $$(C_2H_5)_2—N—CH_2—CH_2—CH_2—CH—CH_3$$
$$|$$
$$NH_2$$

20 parts of water and 1 part of zinc chloride and the mixture is heated for some hours at about 140° C. An oily reaction product is obtained which is extracted with ether. After evaporation of the ether to the residue a benzenic solution of picric acid is added. The picrate separates primarily in a resinous state and solidifies when stirred with alcohol. It may be recrystallized from glacial acetic acid in the form of dark yellow crystals of 159 to 160° C. melting point.

By decomposing the picrate with hydrochloric acid the hitherto unknown base of the formula:

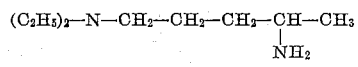

is obtained as a viscous colorless oil.

Example 7

12 parts of quinoline-4-sulfonic acid are mixed with 18 parts of 1-diethylamino-4-aminopentane and 40 parts of water and the mixture is heated at about 135° C. for some hours. When cool the reaction product separates as a viscous oil, it is isolated by extraction with ether, removing the ether, treating the residue with steam and redissolving in ether. In this manner a new compound of the following formula:

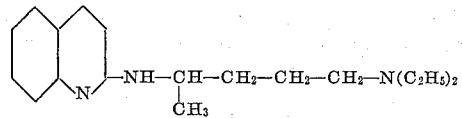

is obtained as a viscous almost colorless oil the picrate of which forms greenish yellow needles of 155 to 157° C. melting point.

When condensing the said sulfonic acid with asymmetrical diethyl-ethylenediamine $$(C_2H_5)_2—N—CH_2—CH_2—NH_2,$$

the reaction product of the formula:

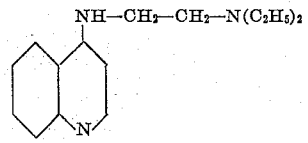

represents an almost colorless oil soluble in ether, the picrate of which melts at 189 to 190° C. The condensation with 1-diethylamino-2-hydroxy-3-aminopropane yields a product of the formula:

being a viscous oil, insoluble in ether, but soluble in chloroform, the picrate of which melts at 162° C.

Example 8

13 parts of 4-methylquinoline-2-sulfonic acid are heated for some hours at 135 to 140° C. with 30 parts of an aqueous solution of cyclohexylamine of about 50% strength with the addition of 0.3 part of copper bronze. By extracting the reaction mass with ether the reaction product is obtained as a crystalline substance. When recrystallized from methylalcohol the hitherto unknown 2-cyclohexylamino-4-methylquinoline of the formula:

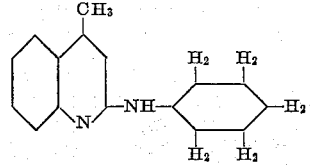

forms almost colorless prisms of 116 to 117° C. melting point.

Example 9

5 parts of 4-methylquinoline-2-sulfonic acid are mixed with 5 parts of aniline, 25 parts of water and 1 part of zinc chloride and the mixture is heated for some hours at 135 to 140° C. The reaction mass is made alkaline by the addition of sodium carbonate and the excess of aniline is distilled off by steam. The isolated 2-anilido-4-methylquinoline of the formula:

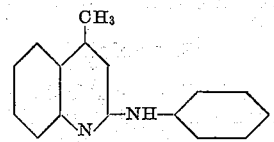

melts when recrystallized from alcohol at 128° C.

Example 10

A mixture of 13 parts of 4-methylquinoline-2-sulfonic acid, 14 parts of β-naphthylamine, 150 parts of water and 0.3 part of copper bronze is heated for some hours at 135 to 140° C. When cool the reaction product is filtered off, washed out and dried. In order to remove unchanged β-naphthylamine the raw product is recrystallized from monochlorobenzene. The 2-β-naphthylamino-4-methylquinoline of the formula:

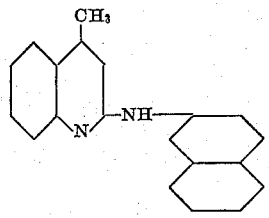

thus obtained, which was unknown hitherto, forms colorless needles of 164 to 165° C. melting point.

We claim:
1. Process for producing amino-compounds of the quinoline series which comprises heating mixtures of compounds of the general formula:

wherein $R_1$ means hydrogen, $R_2$ hydrogen or an aliphatic radicle and $R_3$ hydrogen or an aliphatic, cycloaliphatic or aromatic hydrocarbon radicle of the benzene or naphthalene series, and quinoline sulfonic acids of the formula:

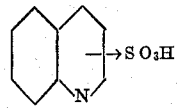

at temperatures above 100° C.

2. Process for producing amino-compounds of the quinoline series which comprises heating mixtures of an aliphatic amine of the formula:

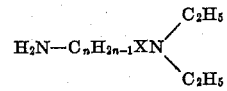

wherein $n$ stands for one of the numbers 2 to 5 and X means hydrogen or hydroxyl, and quinoline sulfonic acids of the formula:

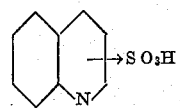

at temperatures above 100° C.

WERNER ZERWECK.
WILHELM KUNZE.